A. GREENMAN.
Whiffletree.
No. 105,065.  Patented July 5, 1870.
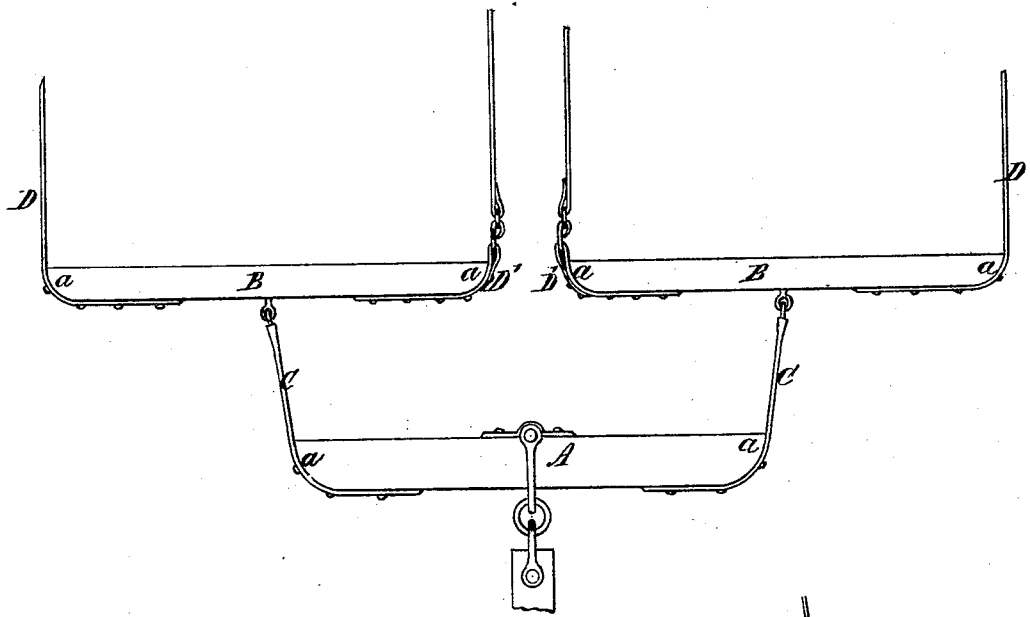
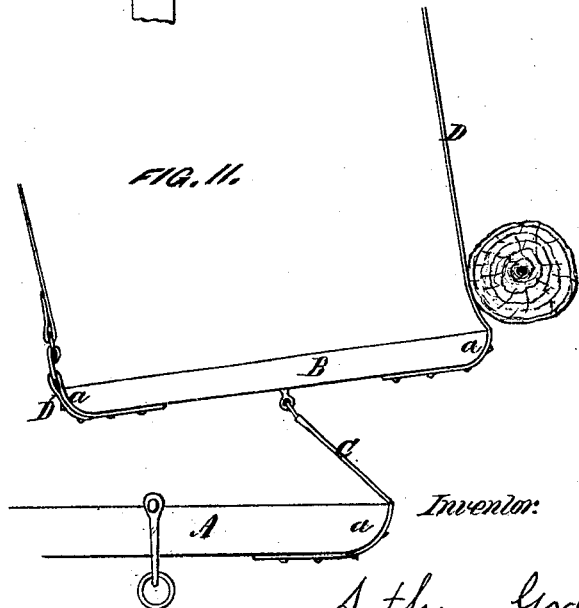

United States Patent Office.

ARTHUR GREENMAN, OF EAST KENDALL, NEW YORK.

Letters Patent No. 105,065, dated July 5, 1870.

IMPROVEMENT IN WHIFFLETREES.

The Schedule referred to in these Letters Patent and making part of the same.

To all whom it may concern:

Be it known that I, ARTHUR GREENMAN, of East Kendall, in the county of Orleans and State of New York, have invented a certain new and useful Improvement in Whiffletrees for use among Fruit-Trees, of which the following is a specification.

Nature of the Invention.

This invention consists in an improved connection of the whiffletrees proper with the "evener," whereby the same have a free lateral movement inward in passing trees, as hereinafter described.

General Description.

In the drawing—

Figure 1 is a plan, showing the attachment in its normal position under action.

Figure 2, a similar view, showing the same in the position when passing a tree.

A is the "evener" or double-tree, and

B B the whiffletrees.

The "evener" is only about half the length of the ordinary "evener." It has attached to its ends long flexible connections, C C, formed either of leather or light spring metal, the attachment being made by simply rounding the ends of the evener, as shown at *a a*, and turning the ends of the straps around them, and fastening them by screws, bolts, or nails. To the loose ends of the connections are secured the whiffletrees, by hooks or otherwise.

The ends of the whiffletrees are rounded similarly to the "evener," and to the outer ends are attached trace-straps, D D, which fasten to the buckles of the harness in front; and to the inner ends loops D' D', to which the ordinary inner traces of the harness connect. These straps and loops form permanent fixtures of the whiffletrees, and they are attached, by screws, nails, or bolts, similar to those on the "evener."

The ends of the whiffletrees, and the "evener," if desired, may be padded with leather at the top and bottom, to obviate rubbing of the bark, if elevated or tilted in passing the tree.

The great advantage in my invention results from the use of the flexible or spring connections C C of considerable length, securing the whiffletrees to the "evener." By this means, when the end of either whiffletree strikes a tree, it is deflected or turned inward, as shown in fig. 2, thereby passing easily and without injury; and, as the "evener" is of short length, there is no danger of contact at the rear. At the same time the deflection or bend of the connection makes no difference in the leverage of the draft, as the distance from the center of the "evener" is not varied in the least. The strain upon the connections produces a degree of spring or elasticity, and, in passing trees, the deflection or bend is so easily produced that no harm can occur to the trees, as I have proved by thorough test.

Furthermore, the wrapping of the trace-straps around the ends of the whiffletrees prevents rough contact.

I am aware that the ends of ordinary traces have been carried around the ends of the whiffletree, and attached by a hook or clasp. Such I disclaim.

I secure an advantage, however, in making a permanent attachment of the traces at the ends where they wrap around the whiffletrees, so that they cannot become displaced, as they do where simply hooked on.

Claim.

What I claim as my invention, and desire to secure by Letters Patent, is—

The flexible or spring connections C C, combined with the "evener" A and whiffletrees B B, in the manner and for the purpose specified.

In witness whereof I have hereunto signed my name in the presence of two subscribing witnesses.

ARTHUR GREENMAN.

Witnesses:
R. F. OSGOOD,
G. WILLM. MIATT.